Aug. 17, 1965 J. P. LINDSEY 3,201,704

PEAK SIGNAL CIRCUIT WITH PARTICULAR FILTER MEANS

Filed Aug. 18, 1961 5 Sheets-Sheet 1

INVENTOR.
J. P. LINDSEY

BY Hudson & Young

ATTORNEYS

INVENTOR.
J. P. LINDSEY
BY
Hudson + Young
ATTORNEYS

PEAK SIGNAL CIRCUIT WITH PARTICULAR FILTER MEANS

Filed Aug. 18, 1961 5 Sheets-Sheet 3

INVENTOR.
J. P. LINDSEY
BY Hudson & Young
ATTORNEYS

INVENTOR.
J. P. LINDSEY
BY
Hudson & Young
ATTORNEYS

INVENTOR.
J. P. LINDSEY
BY Hudson & Young
ATTORNEYS 3,201,704
Patented Aug. 17, 1965

3,201,704

PEAK SIGNAL CIRCUIT WITH PARTICULAR FILTER MEANS

Joe P. Lindsey, Bartlesville, Okla., assignor to Phillips Petroleum Company, a corporation of Delaware
Filed Aug. 18, 1961, Ser. No. 132,429
2 Claims. (Cl. 328—150)

This invention relates to the measurement of maximum and minimum values of signals. In another aspect it relates to the identification of selected vibration patterns in signals which contain noise vibrations.

In various analysis systems there is a need for procedures which are capable of recognizing preselected vibration patterns, including maximum and minimum values, in electrical signals. One example of such a need occurs in the field of seismic prospecting. The desired reflection patterns in recorded seismic signals are often obscured by the presence of random noise vibrations. While various schemes have been proposed for modifying and manipulating these records to increase the signal to noise ratio, it finally becomes necessary to identify individual peaks in the records which are representative of the desired reflections. Heretofore, this has generally been accomplished by an operator visually observing the individual peaks. It is readily apparent that such a system can be both time consuming and the subject of various errors.

In accordance with the present invention, a system is provided for recognizing maximum and minimum values of electrical signals automatically. This is accomplished by transmitting the signals through respective filter networks so that the signals transmitted through the individual networks are 90° out of phase with one another. The output of one of the networks is differentiated so that a series of pulses is provided wherein the individual pulses occur at the times that the peak values occur in the original signals. In accordance with another aspect of this invention, a system is provided for identifying a signal of maximum value in the presence of other signals which appear to have substantially the same configuration.

Accordingly, it is an object of this invention to provide a system for measuring maximum and minimum values of electrical signals.

Another object is to provide a system for identifying preselected vibration patterns in the presence of random noise vibrations.

A further object is to provide a system for manipulating seismic records so as to identify selected reflection patterns in the presence of random noise vibrations.

Other objects, advantages and features of the invention will become apparent from the following description which is taken in conjunction with the accompanying drawing in which.

This invention will be described in conjunction with the interpretation of seismic signals. However, it will become apparent that many features of the invention are by no means limited to this function, but can be applied to the analysis of electrical signals from any sources.

Figure 1:
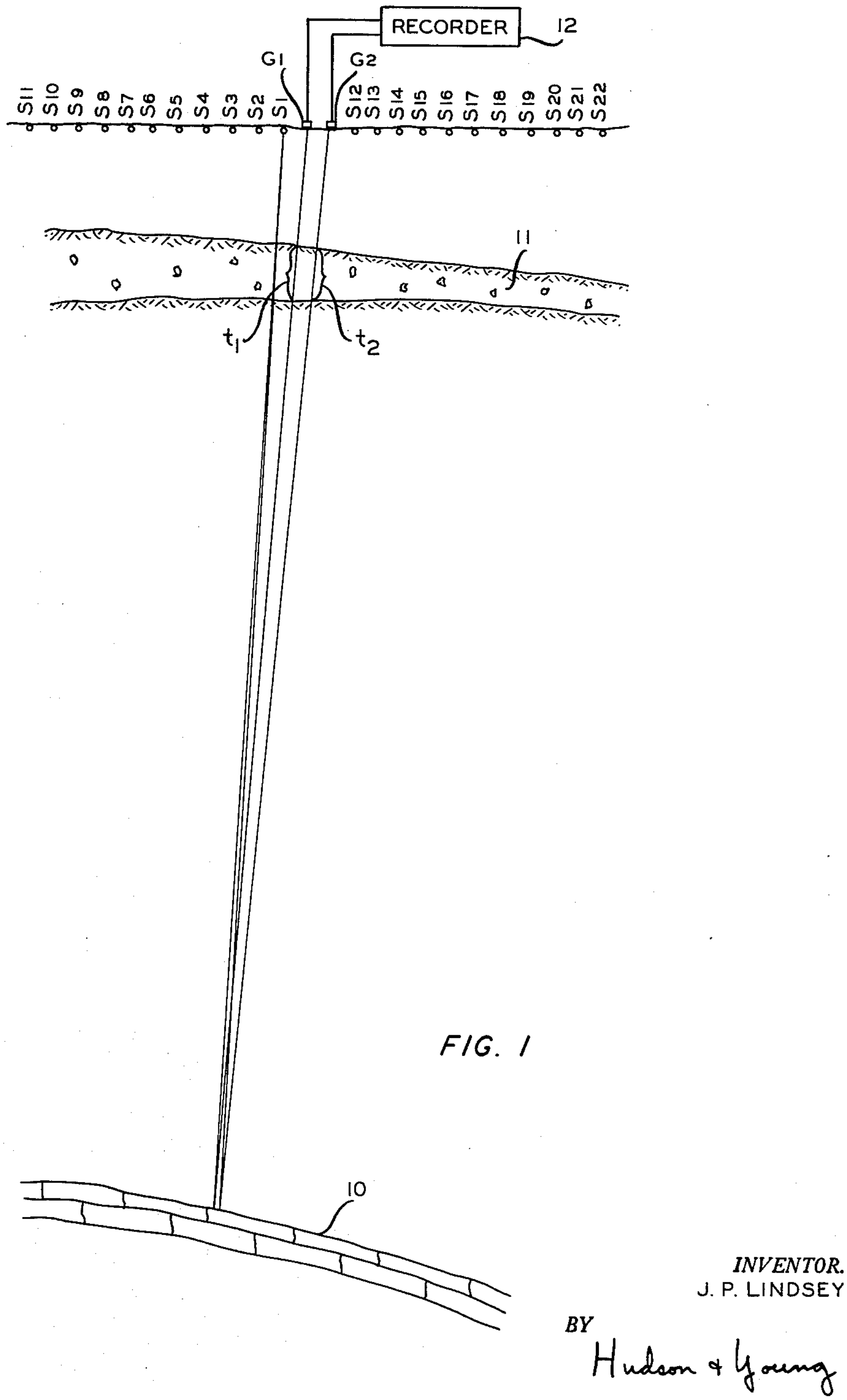
FIGURE 1 is a schematic representation of a seismic exploration system.

Referring now to the drawing in detail and to FIGURE 1 in particular, a seismic exploration system is illustrated schematically. Vibrations are imparted to the earth in sequence at a plurality of locations identified as shot points $S_1$ to $S_{22}$. This can readily be accomplished by detonating explosive charges at the corresponding shot points. The resulting vibrations travel downwardly through the earth and are reflected back to the surface from subterranean formations, such as 10. These vibrations are received at the surface of the earth by a plurality of geophones which are spaced on both sides of each shot point. In order to simplify the drawing, only two such geophones $G_1$ and $G_2$ are illustrated. However, in normal practice a relatively large number of these geophones are positioned on both sides of each shot point. Vibrations emitted from shot point $S_1$ are reflected from bed 10 and returned to respective geophones $G_1$ and $G_2$. Although not shown, vibrations from the remainder of the shot points $S_2$ to $S_{22}$ are also received in sequence by geophones $G_1$ and $G_2$.

It has been discovered that relatively shallow beds 11 often exist which transmit seismic vibrations at greatly varying rates. For example, these beds can be formed of materials which have been leached in part by subsurface fluids so as to leave slumps. In addition, these beds often vary in thickness so that the times of travel of the seismic vibrations through the beds at different locations vary considerably. Because of these beds, the travel times of vibrations from a common shot point to adjacent geophones often differ substantially. This makes the recognition of common reflection patterns in these several signals extremely difficult, if not impossible. The present invention provides a system for measuring the difference in travel times of the several reflections through bed 11. These times are shown as $t_1$ and $t_2$ for the vibrations received by respective geophones $G_1$ and $G_2$. Reflecting bed 10 is a considerable distance below bed 11. Thus, the downwardly moving vibrations follow substantially the same path through bed 11 and have the same travel times. Similarly, since bed 11 is close to the surface, the reflected vibrations received by geophones $G_1$ and $G_2$ from any of the shot points travel through substantially the same paths in bed 11 and have travel times $t_1$ and $t_2$, respectively.

Figure 2:
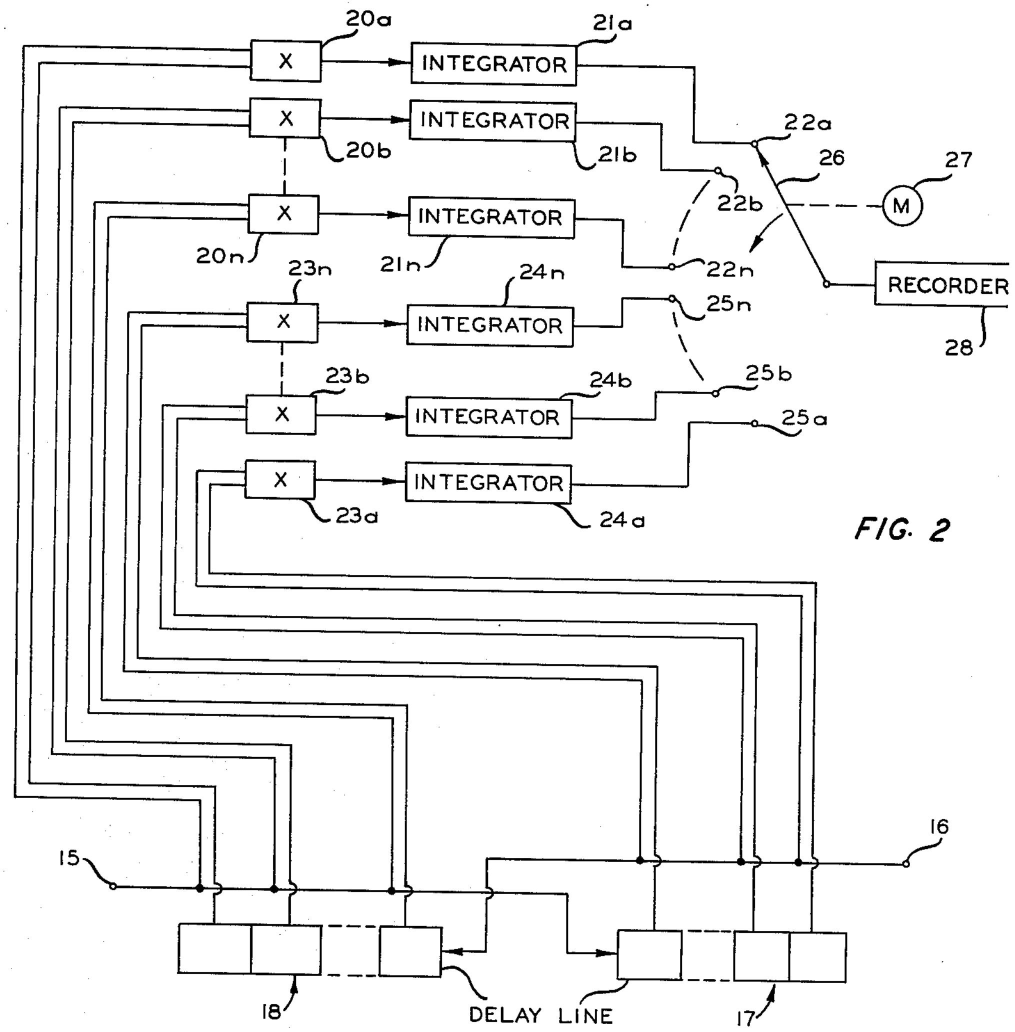
FIGURE 2 is a schematic circuit drawing of apparatus employed to correlate signals obtained by the system of FIGURE 1.

The signals received by geophones $G_1$ and $G_2$ are applied to respective channels of a recorder 12. Magnetic tape recorders can be utilized to advantage for this purpose because the signals can readily be reproduced for subsequent manipulation. The signal received by geophone $G_1$ is thereafter reproduced and applied to input terminal 15 of FIGURE 2. The recorded signal from geophone $G_2$ is simultaneously reproduced and applied to input terminal 16. Actually, these signals are applied between respective terminals 15 and 16 and a reference potential, such as ground. However, this reference ground has been omitted from several of the figures of the drawing in order to simplify the description. Terminals 15 and 16 are connected to the inputs of respective delay lines 17 and 18. These delay lines are provided with a plurality of spaced output terminals so as to provide a plurality of output signals which represent sequential values of the respective input signals. These delay lines can be conventional tapped electrical delay lines, for example. Input terminal 15 and the last output terminal of delay line 18 are applied as the respective inputs to a first multiplier 20*a*. The output of multiplier 20*a* is applied through an integrator 21*a* to a terminal 22*a*. Input terminal 15 and the remainder of the output terminals of delay line 18 are applied as respective inputs to a series of multipliers 20*b* . . . 20*n*. The outputs of multipliers 20*b* . . . 20*n* are applied through respective integrators 21*b* . . . 21*n* to respective terminals 22*b* . . . 22*n*. In a similar manner, input terminal 16 and the outputs of delay line 17 are applied as respective inputs to a plurality of multipliers 23*a*, 23*b* . . . 23*n*. The outputs of multipliers 23*a*, 23*b* . . . 23*n* are applied through respective integrators 24*a*, 24*b* . . . 24*n* to respective terminals 25*a*, 25*b* . . . 25*n*. A switch 26 is rotated by a motor 27 to engage the terminals in sequence. Switch 26 is connected to the input of a recorder 28.

Figure 3:
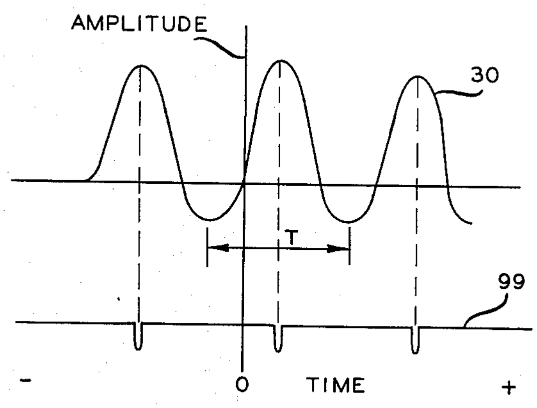
FIGURE 3 is a graphical representation of a typical output signal from the circuit of FIGURE 2 and a typical output signal from the circuit of FIGURE 4.

The two input signals which are applied to terminals 15 and 16 are thus correlated with one another at various time differences therebetween. This correlation is a cross correlation wherein the individual signals are multiplied and the resulting product is integrated. The resulting signal applied to recorder 28 may have the configuration shown by curve 30 of FIGURE 3, for example. FIGURE 3 is a graphical representation of the amplitude of the signal applied to recorder 28 as a function of the time difference between increments of the individual input signals that are multiplied together. The positive time values, in effect, represent the amount one signal is delayed from the other when the correlation is performed, and the negative time values represent the amount the signals are delayed in the reverse order. Under ideal circumstances, curve 30 of FIGURE 3 exhibits a single maximum peak which is clearly defined. When this occurs, the time at which this maximum appears is representative of the difference in time at which common reflections from bed 10 appear in the signals which are received at geophones $G_1$ and $G_2$. This is the desired information which can then be used to displace the original recorded signals from one another before they are reproduced to provide a single composite record. This time difference is the compensation required for all static corrections. Of course, angularity of path corrections still must be made in the usual manner. However, as shown in FIGURE 3, several peaks often appear in curve 30 which makes it difficult, if not impossible, to identify the correct displacement time. The additional apparatus of the present invention which will now be described permits this time to be measured automatically.

The signal recorded on recorder 28 is subsequently reproduced and applied between input terminals 32 and 33 of FIGURE 4, the latter being grounded. An inductor 34 and a resistor 35 are connected in series between terminal 32 and the first input terminal of an amplifier 36. A capacitor 37 is connected between ground and the junction between inductor 34 and resistor 35. A resistor 38 is connected between the second input terminal of amplifier 36 and the contactor of a potentiometer 39. One end terminal of potentiometer 39 is connected to ground. A resistor 40 is connected between the second end terminal of potentiometer 39 and a terminal 41 which is maintained at a positive potential. Amplifier 36 is provided with a feedback resistor 42. The output signal of amplifier 36 is connected through two additional circuits which are identical to the one herein described and wherein corresponding elements are designated by respective *a* and *b* reference characters.

A capacitor 45, a resistor 46 and an inductor 47 are connected in series between the output of amplifier 36*b* and the first input terminal of an amplifier 48. A resistor 49 and a voltage source 50 are connected in series between the output of amplifier 36*b* and the second input terminal of amplifier 48. A resistor 51 is connected between ground and the junction between resistor 49 and voltage source 50. Amplifier 48 is provided with a feedback resistor 52 which has a capacitor 53 connected in parallel therewith. The output of amplifier 48 is connected through two circuits which are identical to the circuit associated with amplifier 48 and wherein corresponding elements are designated by respective *a* and *b* reference characters.

The output of amplifier 48*b* is connected through a capacitor 55, a resistor 56 and an inductor 57, which are connected in series relationship, to the first input terminal of an amplifier 58. A resistor 59 is connected between the second input terminal of amplifier 58 and the contactor of a potentiometer 60. The first end terminal of potentiometer 60 is connected to ground. A resistor 61 is connected between the second end terminal of potentiometer 60 and terminal 41. Amplifier 58 is provided with a feedback resistor 63 which has a capacitor 64 connected in parallel therewith. The output of amplifier 58 is connected through a resistor 65 to one input terminal of an amplifier 66. A resistor 67 is connected between the second input terminal of amplifier 66 and the contactor of a potentiometer 68. The first end terminal of potentiometer 68 is connected to ground. The second end terminal of potentiometer 68 is connected through a resistor 69 to terminal 41. The output of amplifier 66 is connected through a capacitor 70 and a resistor 73 to a terminal 71. A resistor 72 is connected between terminal 71 and ground.

The output of amplifier 48*b* is also connected through an inductor 75 and a resistor 76, which are connected in series relationship, to the first input of an amplifier 77. A capacitor 78 is connected between ground and the junction between inductor 75 and resistor 76. A resistor 80 is connected between the second input terminal of amplifier 77 and the contactor of a potentiometer 81. The first end terminal of potentiometer 81 is connected to ground. The second end terminal of potentiometer 81 is connected through a resistor 82 to terminal 41. Amplifier 77 is provided with a feedback resistor 83. The output of amplifier 77 is connected through a resistor 84 to the first input terminal of an amplifier 85. The second input terminal of amplifier 85 is connected to the contactor of a potentiometer 86. The first end terminal of potentiometer 86 is connected to ground. A resistor 87 is connected between the second end terminal of potentiometer 86 and terminal 41. The output of amplifier 85 is connected through a resistor 90 and a rectifier 91, which are connected in series relationship, to terminal 71. A rectifier 92 is connected between the junction between resistor 90 and rectifier 91 and ground. A third rectifier 93 is connected between terminal 71 and ground.

Terminal 71 is connected through a resistor 94 to one input terminal of an amplifier 95. A resistor 96 is connected between this input terminal and ground. A resistor 97 is connected between the output of amplifier 95 and the second input thereof. The output of amplifier 95 is connected to the first input terminal of a recorder 98, the second input terminal of which is connected to ground. All of the amplifiers of FIGURE 4 are conventional amplifiers having differential inputs.

Figure 9:
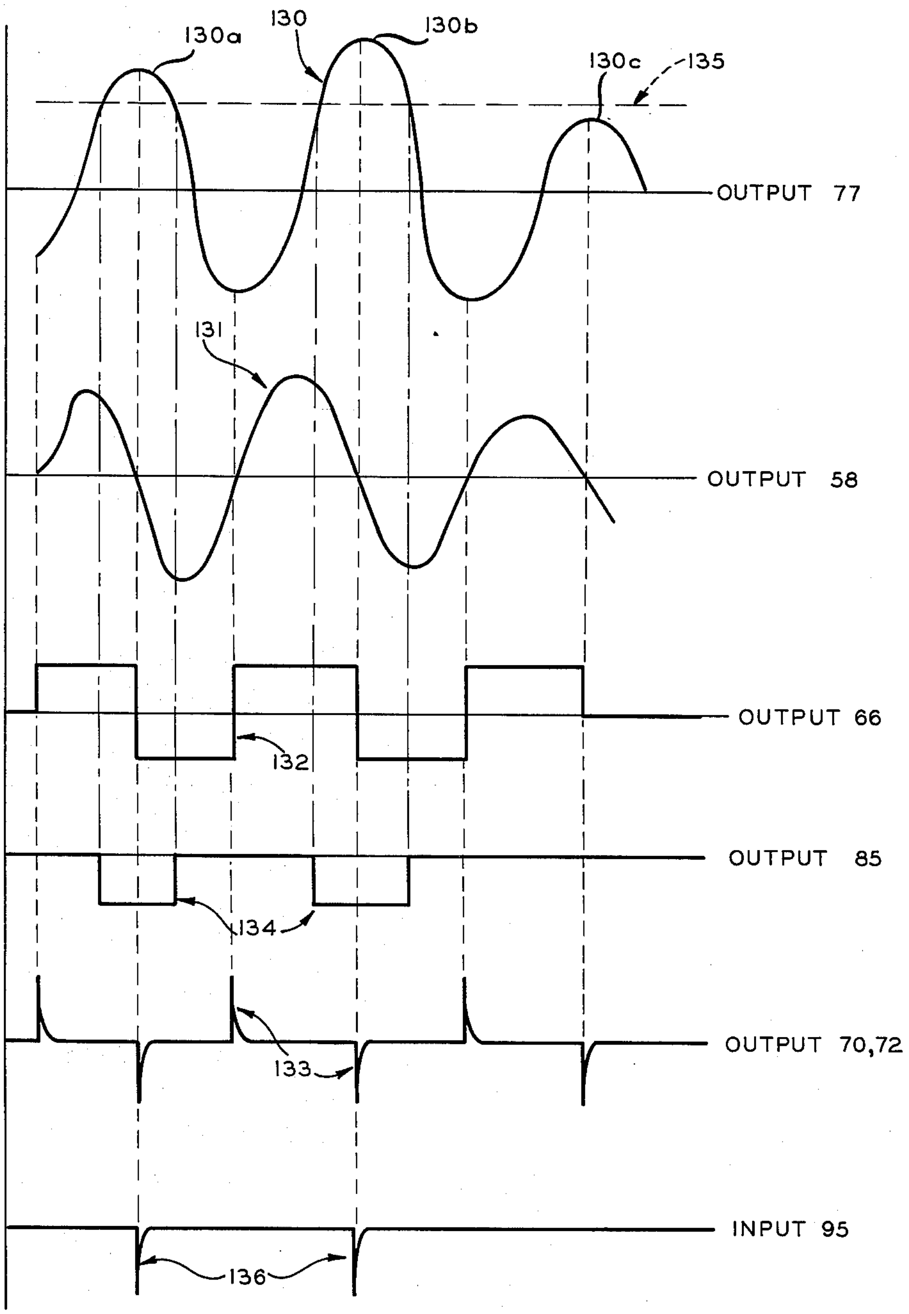
FIGURE 9 is a graphical representation of typical signals which appear at various points in the circuit of FIGURE 4.

The circuit between input terminal 32 and the output terminal of amplifier 77 constitutes a phase corrected Butterworth filter. This circuit is a low pass filter. The circuit between input terminal 32 and the output terminal of amplifier 58 constitutes a network which is the derivative of a phase corrected Butterworth filter. The transmitted frequencies at the output of amplifier 77 are thus 90° out of phase with the transmitted frequencies which appear at the output terminal of amplifier 58. A schematic representation of typical signals at the outputs of amplifiers 77 and 58 is shown by respective curves 130 and 131 of FIGURE 9. It can be seen that curve 130 is of generally the same form as curve 30 of FIGURE 3 in that it has three positive peaks **130*a*, 130*b* and 130*c*. In order to illustrate a feature of the invention, peak 130*c* is illustrated as having a maximum value less than a reference level which is indicated by dotted line 135. The signals at the output of amplifier 58 thus constitute a pure derivative of the corresponding signals at the output of amplifier 77. The bias potential applied to the second input of amplifier 66 serves to clip the signals at a predetermined level to produce a signal of the general configuration of curve 132 of FIGURE 9. Capacitor 70 and resistor 72 form a differentiating circuit so that the signals applied to terminal 71 from amplifier 66 are the derivative of the signals transmitted through amplifier 58. Curve 133 represents such a signal. The bias potential applied to the input of amplifier 85 serves to clip the signals so that only those having an amplitude above a preselected threshold value are transmitted. This eliminates any peaks of small amplitude which may appear in input signal 30. A typical output signal from amplifier 85, as observed at the common junction of elements 90, 91 and 92, is illustrated by curve 134 of FIGURE 9. It can be seen that there is no pulse in curve 134 which corresponds to peak 130*c* of curve 130. This is because the amplitude of peak 130 is less than the threshold value 135. From an inspection of FIGURE 4 of the drawing, it can be seen that the inputs of amplifiers 66 and 85 are reversed with respect to the reference potentials. The output signals from the two amplifiers are thus negative of each other with common input signals. This is illustrated by curves 132 and 134 of FIGURE 9. The rectifier network associated with terminal 71 clips the positive pulses so that only the negative pulses are transmitted on to recorder 98. The signal applied to recorder 98 is thus of the form shown by curve 136 in FIGURE 9. It can be seen that the last negative peak in curve 133 has been eliminated from the final output. This is due to the fact that the output of amplifier 85 maintains diode 91 grounded by virtue of conduction through diode 92 during time of occurrence of the last negative peak of curve 133. During the occurrence of the first two negative peaks of curve 133, diode 91 is disconnected from ground by virtue of no conduction through diode 92, as may be seen from curve 134. Sharp pulses appear at times which correspond to the peaks of signal 30 of FIGURE 3 which are above a preselected threshold value. If minimum values in signal 30** are to be selected, a phase reversal amplifier can be connected to the input of the circuit of FIGURE 4.

Figure 4:
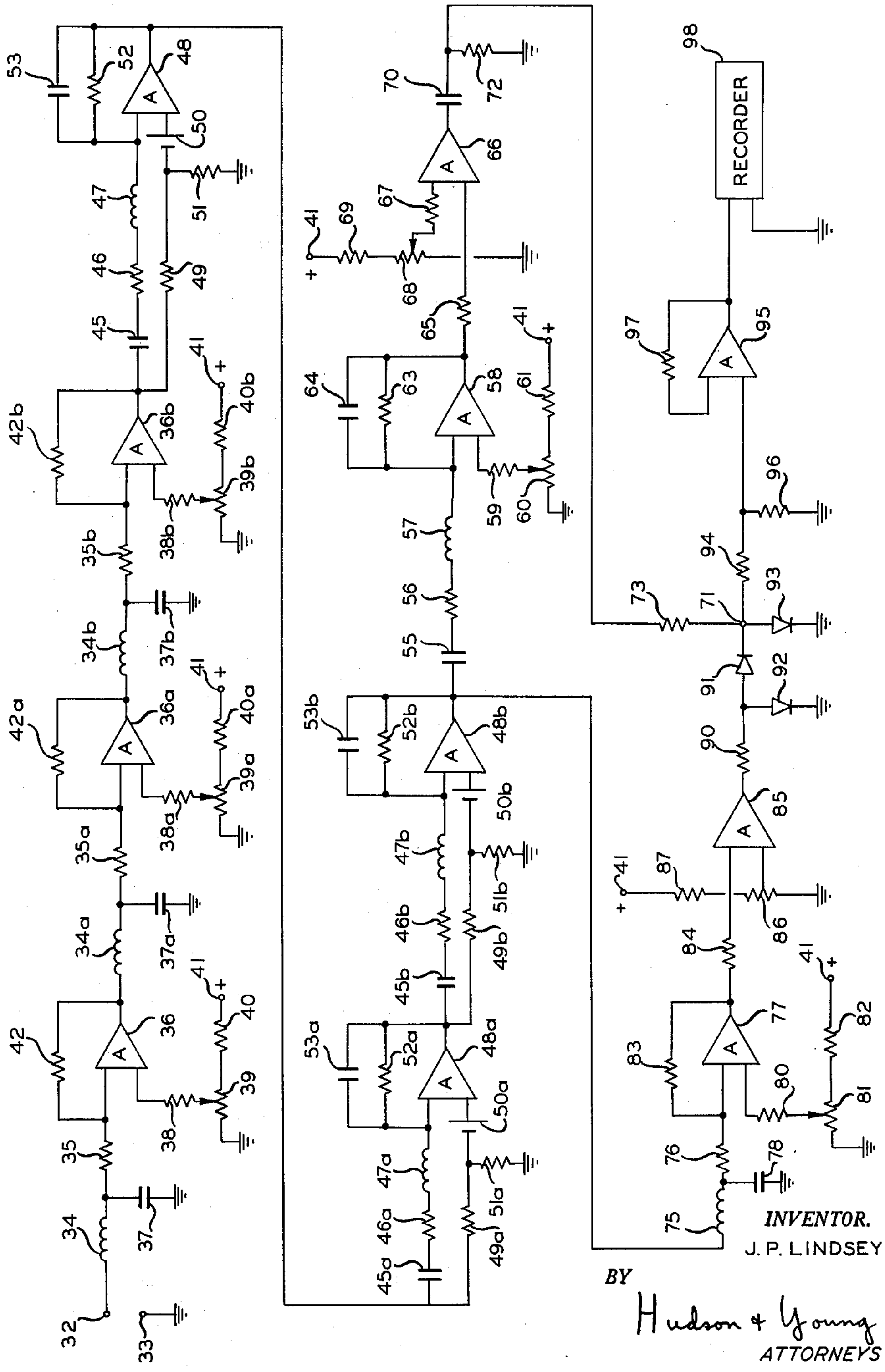
FIGURE 4 is a schematic circuit drawing of a system which selects maximum and minimum values of an input electrical signal.

In one specific embodiment of this invention, the following components are employed in the circuit of FIGURE 4 (all resistances are expressed in $10^3$ ohms, all capacitances in microfarads, and all inductances in henries):

| Component: | Value | Component: | Value |
|---|---|---|---|
| 35 | 420 | 72 | 180 |
| 38 | 10 | 73 | 100 |
| 39 | 5 | 76 | 160 |
| 40 | 300 | 80 | 10 |
| 42 | 510 | 81 | 5 |
| 35a | 160 | 82 | 300 |
| 38a | 10 | 83 | 510 |
| 39a | 5 | 84 | 510 |
| 40a | 300 | 86 | 25 |
| 42a | 510 | 87 | 270 |
| 35b | 420 | 90 | 510 |
| 38b | 10 | 94 | 1,000 |
| 39b | 5 | 96 | 510 |
| 40b | 300 | 97 | 100 |
| 42b | 510 | 34 | 500 |
| 46 | 160 | 34a | 500 |
| 49 | 180 | 34b | 500 |
| 51 | 500 | 47 | 500 |
| 52 | 1,000 | 47a | 500 |
| 46a | 240 | 47b | 500 |
| 49a | 270 | 57 | 500 |
| 51a | 510 | 75 | 500 |
| 52a | 1,000 | 37 | .005 |
| 46b | 360 | 37a | .005 |
| 49b | 390 | 37b | .005 |
| 51b | 510 | 45 | .002 |
| 52b | 1,000 | 53 | $270\times10^{-6}$ |
| 56 | 300 | 45a | .0246 |
| 59 | 10 | 53a | $270\times10^{-6}$ |
| 60 | 5 | 45b | .0035 |
| 61 | 300 | 53b | $270\times10^{-6}$ |
| 63 | 510 | 55 | .006 |
| 65 | 300 | 64 | $270\times10^{-6}$ |
| 67 | 430 | 70 | .001 |
| 68 | 1 | 78 | .005 |
| 69 | 100 | | |

Terminal 41 is maintained at +300 volts. Voltages sources 50, **50*a* and 50*b*** are each 1.3 volts.

Figure 5:
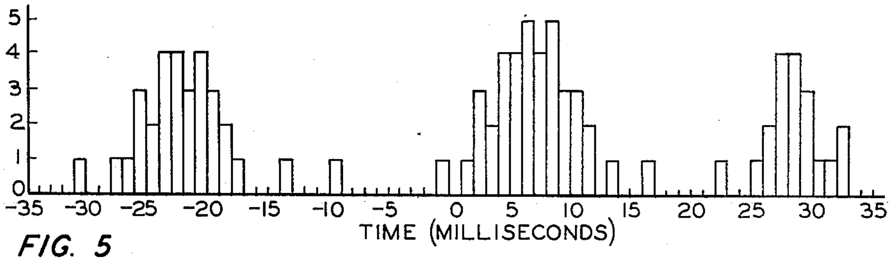
FIGURE 5 is a representation of a typical signal produced by summing a plurality of output signals from the circuit of FIGURE 4.

The next step in the process of this invention is to repeat the correlation and peak picking steps which each pair of signals received by geophones $G_1$ and $G_2$ from the remaining twenty-one shot points. This produces a total of twenty-two curves of the type shown by curve 99 in FIGURE 3. The twenty-two correlations give more accurate results than a single correlation. However, any desired number of correlations can be made. The twenty-two curves are then summed. This summing can readily be accomplished by use of magnetic recorders. The resulting sum can be passed through a unity gain phase reversing amplifier to provide a signal having the general shape of a histogram, as shown in FIGURE 5. The next step is to determine the best degree of correlation represented by the sum of the twenty-two individual correlations.

Figure 6:
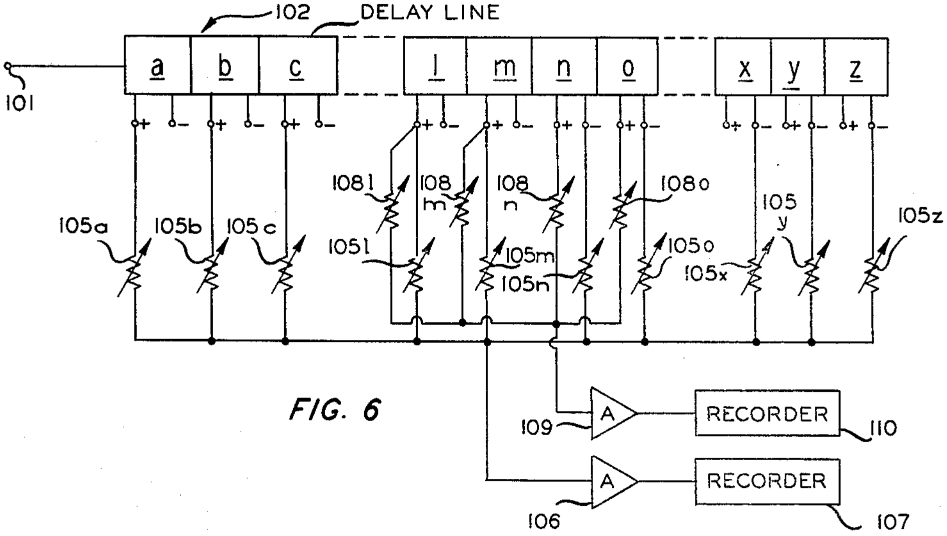
FIGURE 6 is a schematic circuit drawing of a system which is employed to analyze signals of the type shown in FIGURE 5.

An electrical signal having the configuration of the curve of FIGURE 5 is applied to input terminal 101 of a delay line 102 in FIGURE 6. Delay line 102 is provided with a number of sections, each having a pair of output terminals. The two output signals at each section are 180° out of phase with one another. If a conventional delay line with single outputs is employed, a phase reversal unity gain amplifier can be connected to each section to provide the reversed phase signal. The delay between individual sections of delay line 102 can be of the order of one millisecond, for example. The positive output terminals of the first half of the sections and the negative output terminals of the second half of the sections of the delay line are applied through individual adjustable resistors **105*a*, 105*b*, 105*c* . . . 105*l*, 105*m*, 105*n*, 105*o* . . . 105*x*, 105*y*, and 105*z* to the input of a summing amplifier 106. The output of amplifier 106** is applied to a recorder 107. A number of the positive terminals in the center section of the delay line are applied through respective adjustable resistors including 108*l*, 108*m*, 108*n* and 108*o* to the input of a second summing amplifier 109. The output of amplifier 109 is applied to recorder 110.

Figure 7:
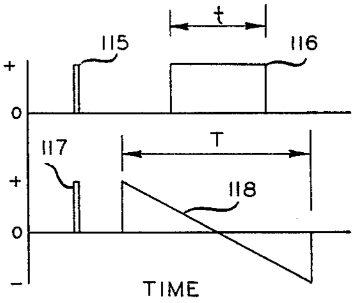
FIGURE 7 is a schematic representation of the operating features of the circuit of FIGURE 6.
Figure 8:
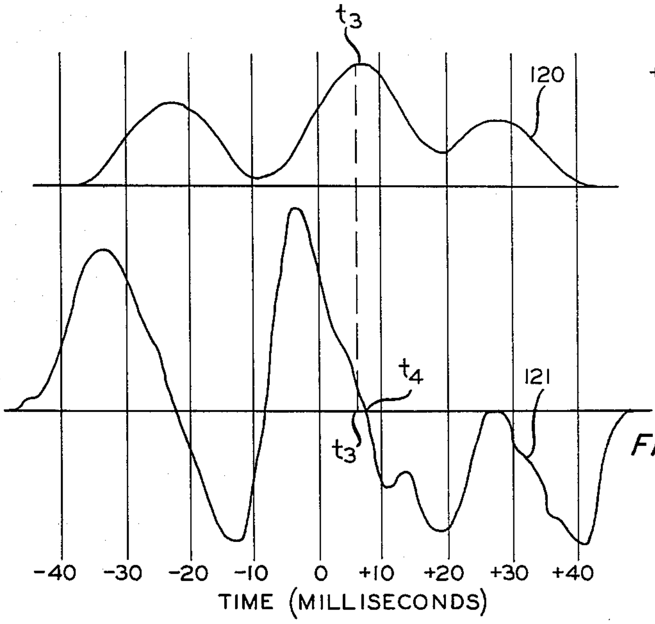
FIGURE 8 is a schematic representation of typical output signals from the circuit of FIGURE 6.

The variable resistors 108 associated with delay line 102 are adjusted so that the response of the delay line through amplifier 109 to a single input pulse 115, as shown in FIGURE 7, is rectangular in shape as shown by pulse 116. The time interval $t$ of pulse 116 is approximately one-half of the period T between either peaks or troughs of curve 30 in FIGURE 3. The variable resistors 105 associated with the positive and negative output terminals of delay line 102 which are applied to summing amplifier 106 are adjusted such that the response to this amplifier to a single input pulse 117 is of the configuration shown by pulse 118. The time duration T of pulse 118 is approximately equal to the period between peaks or troughs of curve 30 in FIGURE 3. The time duration of pulse 118 is thus double the duration of pulse 116. The delay line can be adjusted to provide these responses by applying sharp pulses to the input and observing the recorded outputs. The individual resistors are then adjusted until the desired responses are obtained. A signal of the type shown in FIGURE5 is then applied to input terminal 101. The resulting output signal applied to recorder 110 is of the type shown by curve 120 in FIGURE 8. The signal applied to recorder 107 is of the type shown by curve 121 in FIGURE 8.

The maximum peak of curve 120 occurs at approximately the time $t_3$ which represents the difference between times $t_1$ and $t_2$ of FIGURE 1. However, this time $t_3$ may not be exact. The exact time is the time $t_4$ in FIGURE 8 where curve 121 has zero amplitude adjacent time $t_3$. This corrects for any errors made in the averaging process which is accomplished by the network of FIGURE 6.

In view of the foregoing description, it can be seen that a novel system is provided in accordance with this invention for picking maximum or minimum values of signals and for measuring the degree of correlation between signals. While the invention has been described in conjunction with presently preferred embodiments, it should be evident that it is not limited thereto.

What is claimed is:

1. Apparatus for use in measuring peak values of electrical signals comprising a phase corrected first Butterworth filter means adapted to pass frequencies less than a preselected value, a derivative phase corrected second Butterworth filter means, means to transmit a signal to be measured through each of said filter means, whereby the output signal from said second filter means is 90° out of phase with the output signal from said first filter means, a differentiating circuit having the input thereof connected to the output of said second filter means, output circuit means, means connecting the output of said differentiating circuit means to said output circuit means, unidirectional current flow means connecting the output of said first filter means to said output circuit means, to pass current from said first filter means to said output circuit means, and signal clipping means connected to the outputs of said first and second filter means.

2. Apparatus for use in measuring peak values of electrical signals comprising a phase corrected first Butterworth filter means adapted to pass frequencies less than a preselected value, a derivative phase corrected second Butterworth filter means, means to transmit a signal to be measured through each of said filter means, whereby the output signal from said second filter means is 90° out of phase with the output signal from said first filter means, a differentiating circuit having the input thereof connected to the output of asid second filter means, output circuit means, means connecting the output of said differentiating circuit means to said output circuit means, a first unidirectional current flow means connecting the output of said first filter means to said output circuit means, to pass current from said first filter means to said output circuit means, and second and third unidirectional current flow means connecting the output of said first filter means and said output circuit means, respectively, to a region of reference potential to pass current to said region of reference potential.

References Cited by the Examiner

UNITED STATES PATENTS

| | | | |
|---|---|---|---|
| 2,448,718 | 9/48 | Koulicovitch | 328—150 |
| 2,725,531 | 11/55 | Hemphill | 328—150 |
| 2,832,937 | 4/58 | Ule | 333—70 |
| 2,854,641 | 9/58 | Daguier | 333—70 |
| 2,881,397 | 4/59 | Imm | 333—20 |
| 2,890,420 | 6/59 | Bradburd | 333—20 |
| 2,922,965 | 1/60 | Harrison | 333—28 |
| 2,926,249 | 2/60 | Lindsey | 328—28 |
| 2,976,692 | 4/61 | Grannemann et al. | 340—16 |
| 2,980,871 | 4/61 | Cox | 333—28 |

ARTHUR GAUSS, *Primary Examiner.*

WALTER W. BURNS, JR., *Examiner.*